J. L. KIMBALL.
ENGINE STOP.
APPLICATION FILED OCT. 28, 1911.
1,026,041.
Patented May 14, 1912.
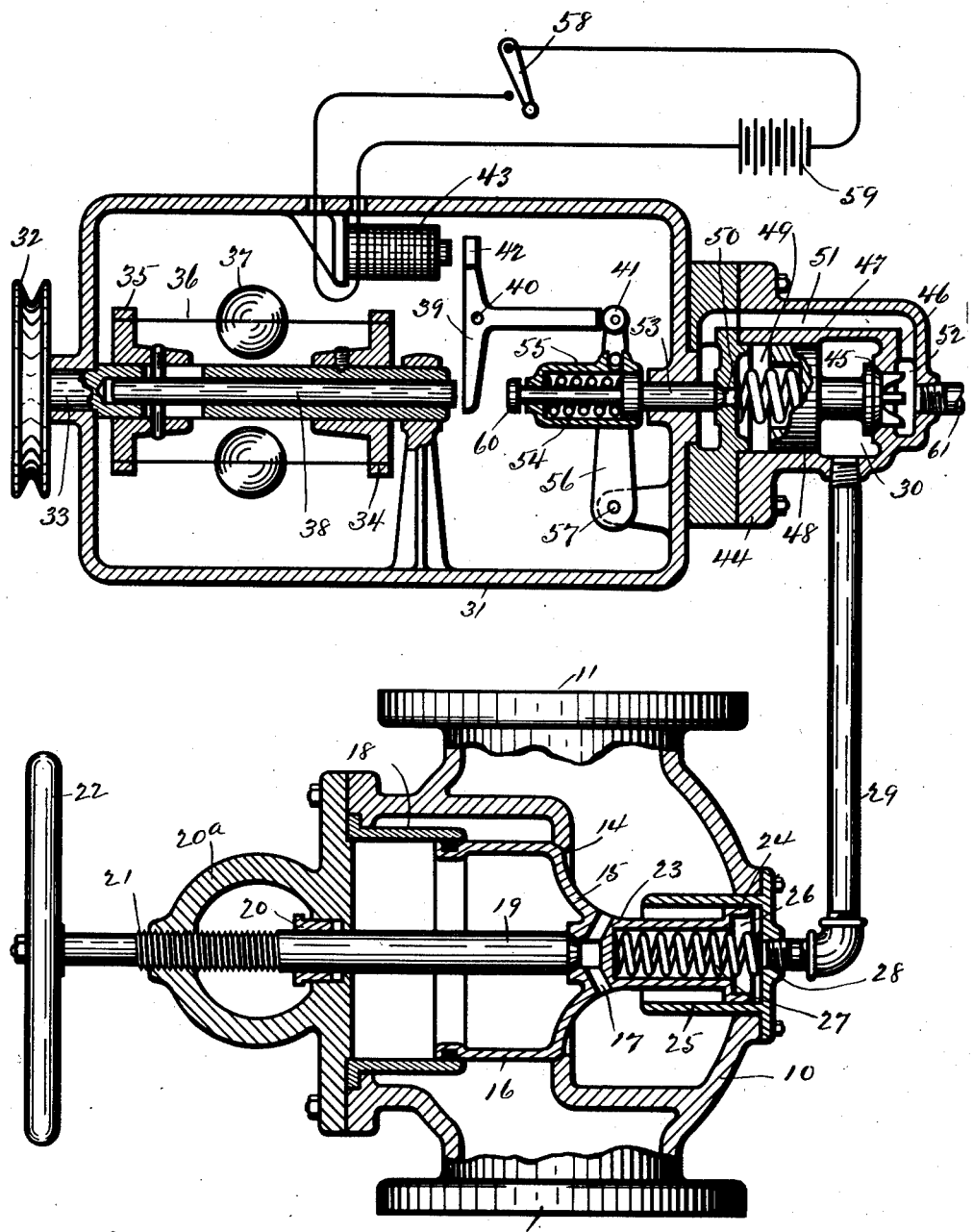

UNITED STATES PATENT OFFICE.

JAMES L. KIMBALL, OF SALEM, MASSACHUSETTS, ASSIGNOR TO LOCKE REGULATOR COMPANY, OF SALEM, MASSACHUSETTS, A CORPORATION OF MASSACHUSETTS.

ENGINE-STOP.

1,026,041.             Specification of Letters Patent.        Patented May 14, 1912.

Application filed October 28, 1911. Serial No. 657,305.

*To all whom it may concern:*

Be it known that I, JAMES L. KIMBALL, of Salem, Essex county, Massachusetts, have invented a new and useful Improvement in Engine-Stops, of which the following is a full, clear, and exact description.

My invention relates to improvements in engine stops, and the object of my invention is to provide an engine stop which will automatically check the flow of steam to an engine when the engine exceeds a certain speed, and also a stop which by electric means may be operated manually from stations remote from the engine. To this end I provide a valve supported in a valve casing having an inlet and outlet for steam, a piston carried by the valve and moving in a cylinder, together with means for moving the piston and closing the valve when the engine exceeds a desired speed. In order to accomplish this I provide a pilot valve which will vent the space back of the piston, and this pilot valve is operated by a centrifugal governor connected with the engine.

Reference is to be had to the accompanying drawings forming a part of this specification, in which similar reference characters indicate corresponding parts in all the views.

The figure shows a vertical section of the engine stop valve, together with automatic and electric means for operating the same.

In the drawings I have indicated a valve casing 10 having an inlet 11 from the boiler and an outlet 12 to the engine. This casing contains a valve seat 14 which is normally closed by the valve disk 15. The valve disk 15 has a cylindrical portion 16 which is adapted to fit loosely into a cylinder 18, this cylinder 18 being supported within the valve casing. The cylindrical portion of the valve disk is made hollow to form a steam receiving compartment or chamber back of the valve disk 15, and the steam entering this compartment balances the valve disk. I provide a stem 19 which passes through the gland 20 in the valve casing and extends axially through the hollow cylindrical portion 16. The stem 19 has a threaded portion 21 which passes through a threaded hole in the yoke 20ª, and has secured to its outer end a hand wheel 22 by which it may be turned. In the lower part of the valve disk 15 near its center, are small holes 17 which provide passage for steam into the hollow cylindrical portion 16. These passages will be closed when the stem 19 is screwed down and the valve permanently closed. Ordinarily the valve will be allowed to open by unscrewing the stem 19, as in such position it will be balanced by the steam in the cylindrical portion 16.

The valve disk 15 has a centrally disposed stem 23 which carries at its outer extremity a piston 24 which is contained in the cylinder 25, this cylinder being secured to the valve casing 10. The piston 24 is used both for guiding the valve disk 15 and also, and more essentially, as an actuator for said disk in order to close it upon its valve seat 14. A chamber 26 is formed or provided in the cylinder 25 back of the piston, which may be increased in size by recesses in the piston, and the steam enters this chamber by passing the piston which it will be understood fits loosely within the cylinder 25. The chamber 26 also contains a coil spring 27 for forcing the valve open when the stem 19 is turned away from the valve disk by means of the hand-wheel. The chamber 26 also has an outlet 28 which is connected by the pipe 29 to the inlet of the valve chamber 30.

In the casing 31 I provide a speed limit governor which is belted from the main shaft of the engine to the pulley 32 and fastened to the shaft 33. This shaft has a collar 34 rigidly secured to it, also a collar 25 which turns with the shaft, but is movable longitudinally thereto. Springs 36 connect the two collars 34 and 35, and these springs carry the balls 37 which operate as a centrifugal governor.

The hollow shaft 33 carries a spindle 38 which is connected with the loose collar 35 and which is free to move laterally whenever the balls 37 are thrown out by their centrifugal action due to the speed of the engine. The end of the spindle 38 is designed to engage a latch 39 which is pivoted at 40. One end of this latch rests against the roll 41 and the upper end carries an armature 42 designed to be attracted by the magnet 43. At the other end of the casing 31 is a flanged casing 44 which contains a pilot valve 45 held to its seat 46 by the spring 47. Formed on the other end of the pilot valve is a piston 48 which fits loosely in the casing 44 so as to allow steam to freely pass said piston and fill the space 49. The space or compartment 49 has an outlet at 50 which communicates by means of a passageway 51 with the chamber 52 and this chamber 52 leads to the open air. The outlet 50 is normally closed by the auxiliary valve 53. This auxiliary valve is held to its seat by the pressure of the spring 54 contained in the casing 55, and the casing 55 is connected with an arm 56 which is pivoted at 57 and has a roll 41 at its outer end.

The magnet 43 is designed to be energized by the closing of an electric circuit by means of a switch 58. I have indicated at 59 a battery. It is understood that this switch may be located at a station or stations remote from the engine and stop. In order to close the valve 15, it is therefore apparent that it will be necessary to open the pilot valve 45 and thus exhaust the pressure from the chamber 26 back of the piston 24. As shown in the drawings the auxiliary valve 53 is held to its seat by the spring 54, and whenever the latch 39 is released from the roll 41, the spring 54 will force the casing 55 against the collar 60 which is formed on the end of the valve stem 53. This allows the steam pressure contained in the chamber 49 to force the auxiliary valve open and relieve the pressure from said chamber through the opening 50 and the passageway 51 to the chamber 52 and thus to the atmosphere at 61. As the piston 47 is larger than the puppet 45, the puppet will be forced open allowing the steam pressure to be exhausted from the chamber 30 and from the chamber 26 in the shut-off valve, thus allowing the pressure on the opposite side of the piston 24 to close the valve disk 15 and thus shut off the steam pressure from the engine. It is apparent that the latch 39 will be released automatically by the spindle 38 whenever the speed of the engine exceeds its normal. The latch 39 may also be released by energizing the magnet 43 by closing the switch as above indicated.

I claim:—

1. An engine-stop comprising a shut-off valve having a cylinder and hollow piston, a manually operated valve operating the said piston for admitting steam thereto, a coiled spring adapted to engage said piston and force the valve seat into engagement with the second mentioned valve, a pilot valve associated with the shut-off valve, a spring pressed valve operating in said pilot valve, and means for automatically operating said pilot valve and venting the shut-off valve.

2. An engine stop comprising a shut off valve having a cylinder and piston, a pilot valve associated with said shut-off valve, said pilot valve comprising a casing, a valve seat in said casing, a spring pressed hollow valve operating in conjunction with said valve seat, an auxiliary valve for venting the hollow valve, means for holding said auxiliary valve closed, and means for opening said pilot valve and venting the shut-off valve.

3. An engine stop comprising a main valve casing, a cylinder in said casing, and a hollow piston operating in said cylinder, a manually operated auxiliary valve for admitting steam to said hollow piston, a valve casing mounted above said main valve casing, and connected therewith by a steam pipe, a pilot valve operating in said second-mentioned valve casing, a valve seat associated with said valve, an auxiliary valve associated with said pilot valve, an arm and latch for holding said valve into engagement with its seat, and electric means operated by a switch remote from said valves, for releasing said latch member, and a coiled spring for forcing the pilot valve from its seat, and thereby opening the pilot valve and venting the main valve.

JAMES L. KIMBALL.

Witnesses:
WILLIAM JONES,
LUCY F. CARROLL.